(12) United States Patent
Osterstock et al.

(10) Patent No.: US 8,402,668 B2
(45) Date of Patent: Mar. 26, 2013

(54) COORDINATE MEASURING APPARATUS

(75) Inventors: Mark David Osterstock, Ladera Ranch, CA (US); Clinton Scott Clark, Lake Forest, CA (US)

(73) Assignee: Q-Mark Manufacturing, Inc., Mission Viejo, CA (US)

( * ) Notice: Subject to any disclaimer, the term of this patent is extended or adjusted under 35 U.S.C. 154(b) by 100 days.

(21) Appl. No.: 12/745,101

(22) PCT Filed: Jan. 6, 2009

(86) PCT No.: PCT/US2009/030221
§ 371 (c)(1),
(2), (4) Date: Sep. 14, 2010

(87) PCT Pub. No.: WO2009/089219
PCT Pub. Date: Jul. 16, 2009

(65) Prior Publication Data
US 2011/0000096 A1    Jan. 6, 2011

Related U.S. Application Data

(60) Provisional application No. 61/019,466, filed on Jan. 7, 2008.

(51) Int. Cl.
*G01B 5/004*    (2006.01)
*G01B 5/008*    (2006.01)

(52) U.S. Cl. ........................... 33/503; 33/559

(58) Field of Classification Search ............. 33/503, 33/556, 557, 558, 559, 560, 561, 572, 832
See application file for complete search history.

(56) References Cited

U.S. PATENT DOCUMENTS

| 3,571,934 | A  | * | 3/1971 | Buck, Sr. ................ 33/505 |
| 4,649,623 | A  | * | 3/1987 | Schneider et al. ............ 483/69 |
| 4,688,307 | A  | * | 8/1987 | Schneider et al. ........... 29/26 A |
| 4,829,677 | A  | * | 5/1989 | Yuzuru ..................... 33/561 |
| 5,014,444 | A  | * | 5/1991 | Breyer ..................... 33/702 |
| 5,041,806 | A  | * | 8/1991 | Enderle et al. ............. 335/295 |
| 5,228,205 | A  | * | 7/1993 | Bertz et al. ................ 33/556 |
| 5,778,551 | A  | * | 7/1998 | Herklotz et al. ............. 33/554 |
| RE37,030  | E  | * | 1/2001 | Lloyd et al. ............... 33/559 |
| 7,055,258 | B2 | * | 6/2006 | Hajdukiewicz et al. ........ 33/559 |
| 7,337,551 | B2 | * | 3/2008 | Roth et al. ................ 33/559 |
| 2007/0068025 | A1 | * | 3/2007 | Harding et al. ........... 33/561 |
| 2012/0137531 | A1 | * | 6/2012 | Osterstock et al. ........ 33/503 |

FOREIGN PATENT DOCUMENTS

| DE | 20215239 U1 | * | 2/2003 |
| JP | 2000131007 A | * | 5/2000 |
| WO | WO 2009089219 A1 | * | 7/2009 |

* cited by examiner

*Primary Examiner* — R. A. Smith
(74) *Attorney, Agent, or Firm* — Hani Z. Sayed; Rutan & Tucker, LLP (57) ABSTRACT

An improved coordinate measuring apparatus is provided. The coordinate measuring apparatus has a device that holds a CMM adapter plate in a way that simulates the locating points on the electromagnetic device in the CMM. Once in place, the threaded cube on the adapter plate is aligned to the CMM machine axes by holding a sliding V-block on the device against any corner of the cube. The screws that hold the threaded cube in the adapter plate are then tightened, and the adapter plate is released from the device. The threaded cube is now square to the CMM X-Y-Z axes.

11 Claims, 5 Drawing Sheets

300 — PERMIT CUBE TO ROTATE RELATIVE TO ADAPTER PLATE

301 — ALIGN ADAPTER PLATE TO ALIGNMENT TOOL

302 — ENGAGE ADAPTER PLATE WITH ALIGNMENT TOOL

304 — ALIGN CUBE TO ALIGNMENT TOOL

COORDINATE MEASURING APPARATUS

CROSS REFERENCE TO RELATED APPLICATIONS

This application claims priority from U.S. PCT Application No. PCT/US2009/030221 filed on Jan. 6, 2009 and U.S. Provisional Patent Application No. 61/019,466 filed on Jan. 7, 2008, which is hereby incorporated herein by reference in its entirety.

FIELD OF THE INVENTION

The field of the invention is for a manufacturing tool. More specifically, the field of the invention is for a manufacturing tool that functions as an adaptable coordinate measuring device adapter.

BACKGROUND

Modern manufacturing quality control facilities use machines called Coordinate Measuring Machines (a.k.a. CMMs). CMMs are used to accurately measure 3-dimensional objects by lightly touching designated surfaces with one or more styli. Each time a CMM stylus touches the object, a computer attached to the CMM instantaneously records the position of the stylus to a high degree of precision. By collecting enough of these positions ("points"), an engineer can quickly and accurately determine the object's conformance to specifications.

CMMs are computer-controlled. A CMM programmer enters a program into the computer that tells the machine where to touch the object. In the case of large and/or complex objects (for example, an automobile engine), CMM programs involve thousands of touches by dozens of different size styli. Often, several individual styli are grouped together as "clusters".

About 20 years ago, CMM manufacturers developed automatic stylus changing devices. These allowed a CMM to run uninterrupted during a lengthy program, automatically switching out styli as needed to measure all the features of a large object. Previously, the machine needed to be stopped and new styli loaded by hand. These stylus changing devices on CMMs are analogous to cutting tool changers on CNC (Computer Numerical Control) machine tools.

A significant difference between stylus changers and cutting tool changers is that stylus changers must be repeatable with regards to styli orientation relative to the CMM axes. Cutting tools, being round, are not affected by their radial orientation to the machine axes. CMM styli clusters, on the other hand, do not rotate. They must always be positioned in exactly the same way in the machine, or measurement results are useless.

To repeatably and accurately orient the stylus cluster each time, CMM manufacturers developed highly repeatable "adapter plates" to hold stylus clusters. These adapter plates employ a threaded cube from which individual styli protrude in various directions. This threaded cube can be rotated axially with regards to the adapter plate, allowing the styli access to points at any angle. The adapter plate is fixed to the CMM by means of an electromagnet. By de-energizing the electromagnet, a plate is released into a rack. The machine then moves to another plate, re-energizes the electromagnet, which causes the plate to lock into place in the machine.

CMM operators often need the threaded cube on the adapter plate to be oriented exactly square to the CMMs axes of motion. By doing so, all styli will, in turn, be aligned to the machine's X-Y-Z axes. This greatly simplifies machine set-up and programming.

However, what is needed is an improved coordinate measuring apparatus which may be more precise and efficient to use than the prior art coordinate measuring devices. Additionally, a need exists for a more compact and simple coordinate measuring apparatus.

SUMMARY OF THE INVENTION

The present invention provides an improved coordinate measuring apparatus. Moreover, the present invention provides a device that holds a CMM adaptor plate in a way that simulates the locating points on the electromagnetic device in the CMM. Once in place, the threaded cube on the adaptor plate may be aligned square to the machine axes by holding a sliding "vee" on the device against any corner of the cube. The screws that hold the threaded cube in the adaptor plate are then tightened, and the adaptor plate is released from the device. The threaded cube is now square to the CMM X-Y-Z axes.

Among the many different possibilities contemplated, the apparatus may allow for multiple configurations of the apparatus whereby the device may simulate the locating points in a CMM.

Additionally, in an exemplary embodiment, the apparatus may be configured such that the device may be hand held.

To this end, in an exemplary embodiment of the present invention, an apparatus for use with a coordinate measuring machine, the apparatus comprising: an adapter plate with an upper surface and lower surface wherein the adapter plate includes at least an alignment feature; a cube connected to the upper surface of the adapter plate wherein the cube is rotates relative to the adapter plate; and a securing mechanism for connecting the cube to the adapter plate.

In an exemplary embodiment, wherein the at least an alignment feature includes at least a slot on an upper surface of the adapter plate.

In an exemplary embodiment, further comprising: at least one port to support a stylus.

In an exemplary embodiment, wherein the adapter plate includes a plurality of slots on the upper surface of the adapter plate, where a first slot is 90 degrees from a second slot.

In an exemplary embodiment, further comprising: the cube having a threaded member to couple to the adapter plate.

In an exemplary embodiment, wherein the securing mechanism is at least one screw through the adapter plate, frictionally securing the cube relative to the adapter plate.

In an exemplary embodiment, wherein the cube aligns square to a machine axes by holding a sliding "V" against any corner of the cube.

In an exemplary embodiment, wherein the apparatus allows for proper alignment in an X, Y, and Z axes, by aligning a sliding "V" against any corner of the cube with the at least one slot on the adapter plate.

In a further exemplary embodiment an apparatus for aligning an adapter plate with an axis of a coordinate measuring machine, the apparatus comprising: a frame; a v-block coupled to the frame; and a locking mechanism on the frame that affixes the apparatus to the adapter plate during alignment.

In an exemplary embodiment, wherein the v-block is slidably coupled to the frame.

In an exemplary embodiment, wherein the v-block includes a shaped edge to fit with the adapter plate.

In an exemplary embodiment, wherein the v-block is positioned relative to the locking mechanism to properly align the adapter plate with the axis of the coordinate measuring machine.

In an exemplary embodiment, configured to properly align the adapter plate with the axis of the coordinate measuring machine, wherein the adapter plate comprises: at least one slot on an upper surface of the adapter plate; a cube connected to the adapter plate; wherein the cube is permitted to rotate relative to the adapter plate; and a securing mechanism that affixes the cube to the adapter plate and prevents further rotation of the cube relative to the adapter plate.

In an exemplary embodiment, wherein the locking mechanism of the apparatus is configured to secure to the slot on the adapter plate and the v-block is configured to slide and abut a corner of the cube.

In an exemplary embodiment, wherein the locking mechanism is positioned relative to the v-block, so that when the locking mechanism is secured to the adapter plate and the v-block abuts the corner of the cube, the adapter plate is properly aligned with the axis of the coordinate measuring machine.

In a further exemplary embodiment, a method to align an adapter plate with an axis of a coordinate measuring machine, wherein the adapter plate includes a cube coupled to the adapter plate that is permitted to rotate relative to the adapter plate and a securing mechanism to prevent the cube from rotating relative to the adapter plate; comprising: permitting the cube to rotate relative to the adapter plate; aligning the adapter plate with an alignment tool, wherein the alignment tool includes a v-block slidably coupled to a frame and a locking mechanism coupled to the frame; locking the adapter plate to the alignment tool; positioning the v-block of the alignment tool against a corner of the cube of the adapter plate; and securing the securing mechanism of the adapter plate to prevent the cube from rotating relative to the adapter plate.

In an exemplary embodiment, wherein aligning the adapter plate is by inserting the locking mechanism of the alignment tool into a slot on the adapter plate.

In an exemplary embodiment, wherein positioning the v-block against the corner of the cube is by sliding the v-block against the cube while permitting the cube to rotate so that a corner of the cube is seated inside an indention in the v-block.

In an exemplary embodiment, wherein the locking mechanism of the alignment tool is positioned relative to the v-block so that when the v-block is positioned against the corner of the cube, the adapter plate is properly aligned with the axis of the coordinate measuring machine.

In another exemplary embodiment, it is contemplated that the apparatus may be inexpensive to produce and construct.

In yet another exemplary embodiment, it is contemplated that the apparatus may have a unique method to align the threaded cube to the adaptor plate.

Still a further exemplary embodiment contemplates where the apparatus may have a threaded cube on the adaptor plate which aligns the square to the machine axes by holding a sliding portion on the device against any corner of the cube.

In a further exemplary embodiment, it is contemplated that the apparatus may have at least a plurality of screws that hold the threaded device in the adaptor plate.

A further exemplary embodiment contemplates that the apparatus may have at least an adaptor plate and a threaded cube portion.

In another exemplary embodiment, it is contemplated that the apparatus may be constructed of any suitable material such as metal, alloy and the like.

Further, a contemplated embodiment of the apparatus may be constructed of a suitable material such as rubber, foam, composite, plastic and the like whereby the device may be rigid enough to provide the function of alignment.

In yet another exemplary embodiment of the present invention, the apparatus may have a plurality of screws that hold the threaded cube and the adaptor plate which allows for release of the adaptor plate.

In an exemplary embodiment of the present invention, an apparatus may be provided whereby the apparatus may allow for accurate orientation to any angle about the apparatus.

Various objects, features, aspects and advantages of the present invention will become more apparent from the following detailed description of preferred embodiments of the invention, along with the accompanying drawings in which like numerals represent like components.

DETAILED DESCRIPTION

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

An improved coordinate measuring apparatus 1 is provided. The coordinate measuring apparatus 1 has a device that holds a coordinate measuring machine (CMM) adapter plate 100 in a way that simulates the locating points on the electromagnetic device in the CMM. Once in place, the threaded cube 108 on the adapter plate 100 is aligned square to the CMM machine axes by holding a sliding V-block on the device against any corner of the cube. The screws that hold the threaded cube 108 in the adapter plate 100 are then tightened, and the adapter plate 100 is released from the device. The threaded cube 108 is now square to the CMM X-Y-Z axes.

Figure 1A:
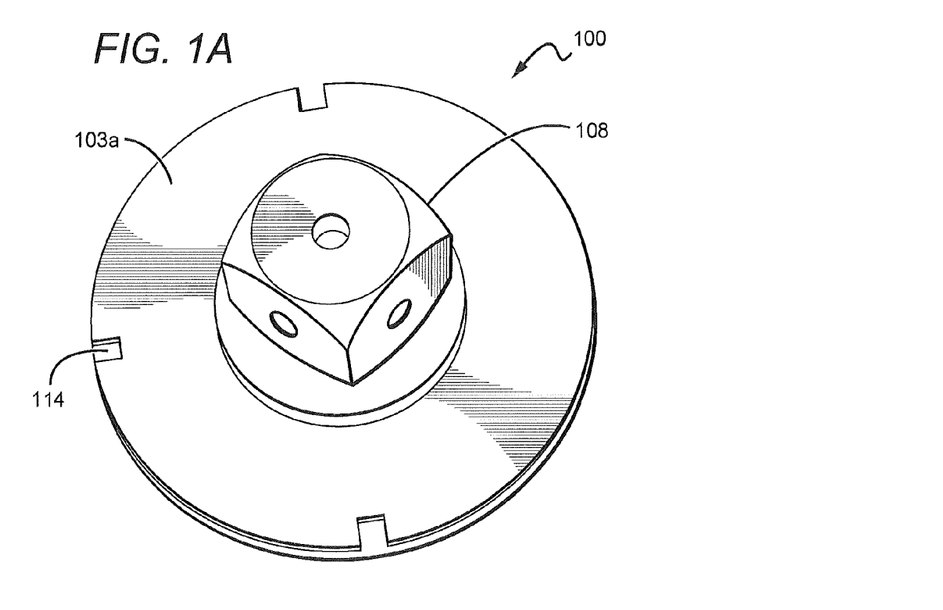
FIG. 1A is a top view of the device in an exemplary embodiment of the present invention.
Figure 1B:
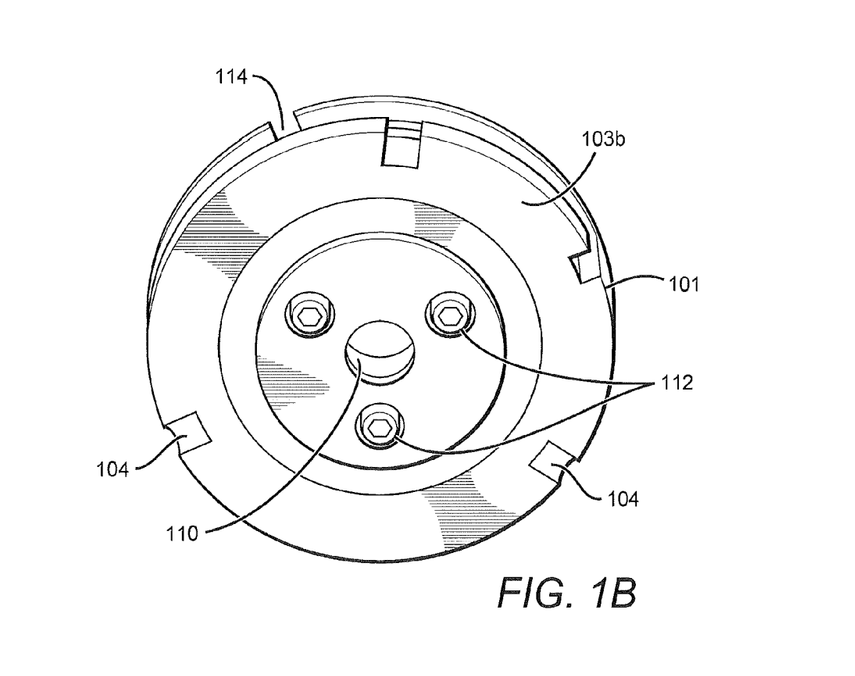
FIG. 1B is a bottom view of the device in an exemplary embodiment of the present invention.

FIG. 1 illustrates an exemplary adapter plate 100 that may be used with a CMM to orient and support a stylus cluster (not shown), where F*igure* 1A illustrates a top view and FIG. 1B illustrates the bottom view. Generally, the adapter plate 100 may support the stylus cluster and may couple to the CMM by a cube attachment member. The cube 108 may be coupled to the CMM by an electromagnet. By energizing and de-energizing the electromagnet, the adapter plate 100 may be secured to the CMM or removed, to be replaced with another adapter plate 100 supporting a different stylus cluster.

Adapter plate 100 may support a single stylus or a styli cluster (not shown). For example, the adapter 100 may be generally cylindrical with an outer circumference 101, an upper surface 103a, and a lower surface 103b. The adapter plate 100 may use ports 104 to support a single stylus or a styli cluster (not shown). Ports 104 may be along the outer circumference 101 of the adapter plate 100. The adapter plate 100 may include one or more ports 104 along the outer circumference 101. The one or more ports 104 may be arranged symmetrically around the outer circumference 101, or may be at any non-symmetric desired spacing. The one or more ports 104 may support a stylus in a radial direction may screwing in a head of the stylus into the port 104. Alternatively, the stylus, styli cluster or ports 104 may be configured to support the stylus or styli cluster in different orientations relative to the adapter plate surface. The adapter plate 100 may also support a stylus or styli cluster from a center bore 110.

The adapter plate 100 may be coupled to the CMM by an attachment member 108. For example, the attachment member 108 may be a cube that couples to an indented cube shape within the CMM that may be secured by an electromagnet or other mechanical devices, such as a vice. The cube 108 may rotate about a longitudinal axis of the adapter plate 100 to further orient the stylus or styli cluster relative to the CMM axis. Cube 108 may include a threaded rod (not shown) that couples to the adapter plate 100 at its center through a threaded bore 110. The screw-type couple between the cube 108 and adapter plate 100 permits the cube to rotate relative to the adapter plate 100. Other coupling devices may alternatively be used to permit the cube to rotate relative to the adapter plate 100. Adapter plate 100 may include a securing mechanism that prevents further rotation of the cube 108 relative to the adapter plate 100. For example, screws 112 may be used to secure the orientation of the cube 108, and prevent further rotation.

The adapter plate 100 may include alignment features to use with the alignment tool 200 to orient the adapter plate and cube for proper alignment with the CMM axis. For example, the adapter plate 100 may include slots 114 along the outer circumference 101, along a an upper surface 103a. Slots 114 may be used with the alignment tool (see FIG. 2). In one embodiment, adapter plate 100 includes three slots 114, where the first and second slots are aligned across from each other, 180 degrees apart, and the third slot is in the middle, oriented 90 degrees from the first and second slots. The slots 114 are such to indicate the axis of the CMM. In an alternate embodiment, additional or fewer slots may be added to orient the adapter plate 100 at different angles relative to the CMM axis. For example, a fourth slot may be included 30 degrees from the first slot. This fourth slot may be used with the alignment tool to orient the adapter plate 30 degrees from the CMM axis.

Figure 2:
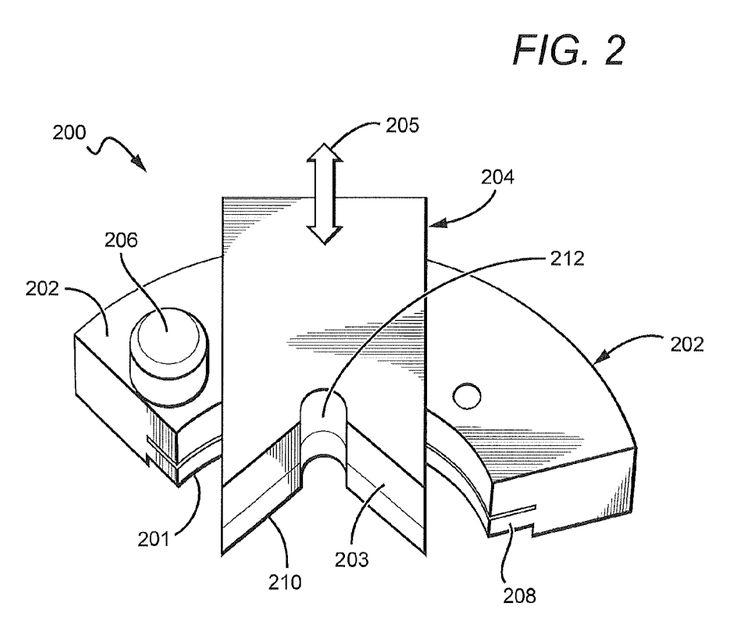
FIG. 2 is a perspective view of the alignment tool in an exemplary embodiment of the present invention.

FIG. 2 illustrates an exemplary alignment tool 200 to orient the adapter plate 100 with the CMM axis. Generally, the alignment tool 200 uses a v-block and locking mechanism to align the cube of the adapter plate 100. The v-block may be configured to correspond to any corner of the cube, while the locking mechanism may be used to interact with any of the slots on the adapter plate 100. Therefore, a user may choose a desired slot to orient the cube. During operation, the cube may be permitted to rotate relative to the adapter plate 100. The cube may then be aligned with the v-block, while the locking mechanism may be aligned with the desired slot on the adapter plate 100. The cube may then be secured to the adapter plate 100 to prevent further rotation. The alignment tool 200 may then be removed at which point the adapter plate 100 may be ready for to install in the CMM.

In one embodiment, the alignment tool 200 may include a frame 202 to interact with the adapter plate 100. The frame 202 may support locking mechanism to align with a slot 114 on the adapter plate 100. For example, a locking pin 206 may be used to secure the frame 202 to the adapter plate 100 during alignment. The locking pin 206 may be secured to the frame 202, but may move along its longitudinal axis. Therefore, the locking pin 206 may be pulled away from the surface of the frame 202 to disengage a slot 114 on the adapter plate 100, while the locking pin 206 may be pushed towards the surface of the frame 202 to engage a slot 114 on the adapter plate 100. The locking pin 206 may be biased, such as by a spring, into a locked position. Therefore, a user would merely have to engage the locking pin 206 for the desired action, such as releasing the locking pin 206 to engage or release the adapter plate 100.

The frame 202 may be designed to further secure an attachment to the adapter plate 100. For example, an inside perimeter 201 of frame 202 may be generally shaped to correspond to the outer circumference of the adapter plate 100. For example, as seen in FIG. 1, the outer circumference of the adapter plate 100 may be generally cylindrical; therefore, the inside perimeter 201 of the frame 202 may also be generally cylindrical. The inside perimeter 201 may also include a flange 208.

The alignment tool 200 may additionally include a v-block 204 to interact with the cube 108 of the adapter plate 100. The v-block 204 may include an inner edge 203 that is generally shaped 210 to correspond to a corner of the cube 108. For example, the inner edge 203 may be shaped 210 as a 90 degree triangle projecting into the v-block to correspond to the 90 degree corner of the cube 108. The vertex 212 of the triangle may be curved or include a partial circle to reduce stress at this point.

In one embodiment, the v-block 204 may slide with respect to the frame 202. The v-block 204 may slide, for example, in a generally radial direction from the inside perimeter 201 of frame 202, arrow 205. The v-block 204 may be coupled to the frame 202 in any manner that may permit it to slide relative to the frame 202. For example, the frame 202 or v-block 204 may include a projection, while the other includes a mortise to permit one to slide on the other. The ends of the projection or mortise may be shaped to prevent one from disengaging the other. The couple between the v-block 204 and frame 202 may also be spring loaded to bias the position of the v-block 204 relative to the frame 202. For example, the v-block 204 may be biased towards the inside of the inside perimeter 201 of frame 202, thereby pressing against the cube 108 when the adapter plate 100 is positioned in the alignment tool 200.

In an exemplary embodiment, the alignment tool 200 may be a hand held device. However, it should be contemplated that in an exemplary embodiment, the alignment tool 200 may be small enough to use manually to align the adapter plate 100 without the assistance of other support devices or heavy machinery. In an exemplary embodiment, it is contemplated that the alignment tool 200 may be under 10 inches, and preferably under 5 inches. An advantage to its relatively small and simple size is that the alignment tool 200 may be mechanically simple for low maintenance and easy manufacturing. Further the alignment tool 200 may be easily replaced by other alignment tools 200 without complex configuration of heavy machinery and the like. The alignment tool 200 may employ few moving parts, but may include at least a locking pin 206 and permit the relative motion between the v-block 204 and the frame 202. However, the alignment tool 200 may be easy to manipulate to quickly and properly align to the adapter plate 100.

Figure 3:
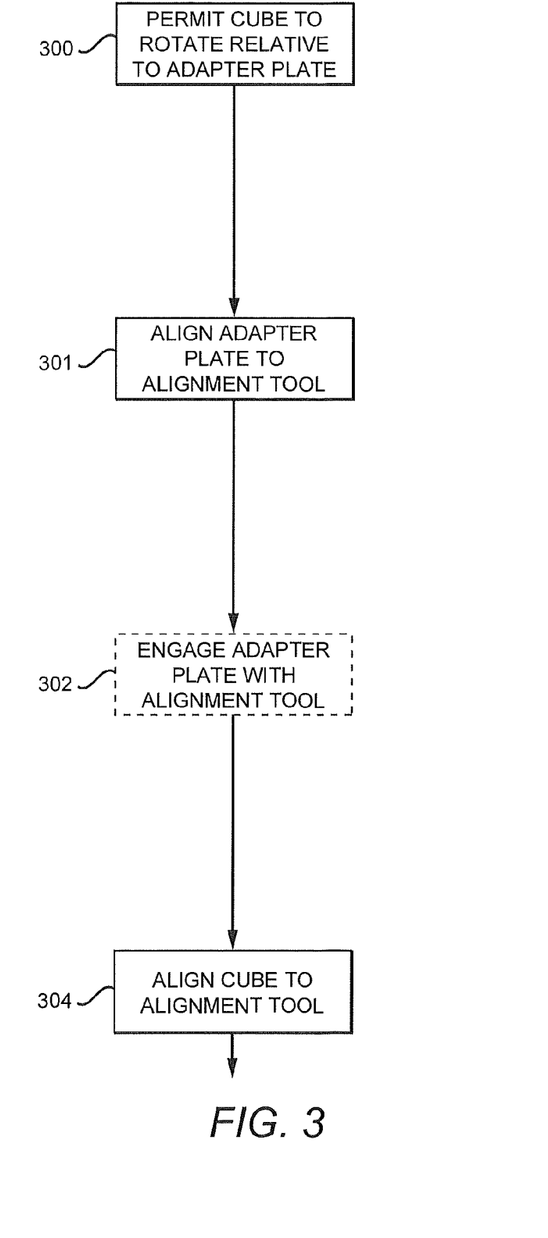
FIG. 3 is a block diagram of a illustrative method of the adapter plate in an exemplary embodiment of the present invention.

FIG. 3 illustrates a representative method of utilizing the alignment tool 200 with an adapter plate 100, along with the associated progression of representative acts for a particular embodiment of an alignment tool 200 and adapter plate 100 which are illustrated in FIGS. 3A-3F. Generally, while the cube 108 is permitted to rotate relative to the adapter plate 100, the alignment tool 200 is used to properly position the cube 108 relative to the adapter plate 100; then the cube 108 is secured to the adapter plate 100 to prevent further rotation, at which point the alignment tool 200 may be removed from its association to the adapter plate 100. In an exemplary embodiment, it is contemplated that the alignment tool 200 positions the adapter plate 100 using the slots 114 on the adapter plate 100 and corresponding pin 206 on the alignment tool 200, while properly positioning the cube 108 using the v-block 204 portion of the alignment tool 200.

Further, FIGS. 3A-3F represents a block diagram of a illustrative method of using the alignment tool 200. The following method is described in terms of an exemplary embodiment for the adapter plate 100 and alignment tool 200. A person of skill in the art can should contemplated that the steps may be combined, skipped, or performed out of order, all of which are considered within the scope of the invention. The method may also be modified to accommodate different embodiments of the adapter plate 100 or alignment tool 200 without deviating from the scope of the invention. First, step 300, the cube 108 is permitted to move relative to the adapter plate 100. Step 301 illustrates that the adapter plate 100 may be aligned to the alignment tool 200. Step 302 is optional and depends on the chosen adapter plate 100 and alignment tool 200 embodiments, but the adapter plate 100 may be engaged with the alignment tool 200 to keep proper alignment between the adapter plate 100 and the alignment tool 299. In step 304, the cube 108 may be aligned with the alignment tool 200 relative to the already aligned adapter plate 100. Step 305 is optional and depends on the chosen adapter plate 100 and alignment tool 200 embodiments, but the cube 108 may be secured to the alignment tool 200 to keep proper alignment between the cube 108 and the alignment tool 200. Finally, in step 306, the cube 108 may be secured relative to the adapter plate 100. The alignment tool 200 may then be removed (see FIG. 4) and the adapter plate 100 is properly aligned with the CMM coordinate axis and ready for use.

Figure 3A:
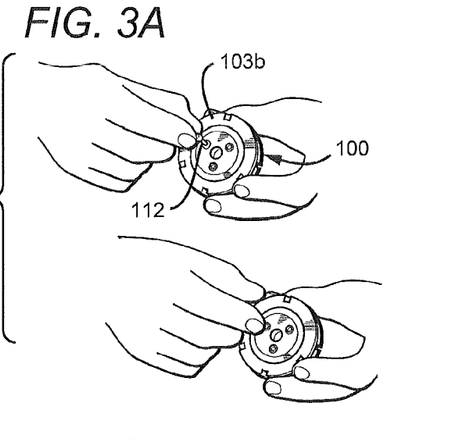
FIG. 3A is a perspective view of the adapter plate in an exemplary embodiment of the present invention.

First, in step 300, referring to FIG. 3A, the cube 108 (see FIG. 3B, 314) may be permitted to rotate relative to the adapter plate 100. In one embodiment, screws 112 may be used to secure the relative position of the cube 108 to the adapter plate 100. For example, screws 112 may be through a lower surface 103*b* of the adapter plate 100 and frictionally engage a lower surface (not shown) of cube 108 to prevent rotation. Therefore, the screws 112 on the lower surface 103*b* of the adapter plate 100 may be loosened to permit the cube 108 to rotate. Other securing devices may alternatively be used, such as locking pins, detent, friction, adhesive, etc. The appropriate loosening to permit relative rotation will depend on the embodiment of the adapter plate 100.

Figure 3B:
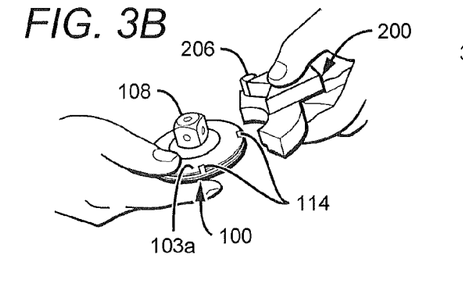
FIG. 3B is another perspective view of the adapter plate and the alignment tool in an exemplary embodiment of the present invention.

Referring to step 301 as illustrated in FIG. 3B, the adapter plate 100 may be aligned to the alignment tool 200. In one embodiment, the adapter plate 100 may include slots 114, and the alignment tool 200 may include pin 206. Slots 114 may be on an upper surface 103*a* of the adapter plate 100 along a circumferential edge. The adapter plate 100 may include more than one slot 114 positioned around the circumferential edge at desired alignments relative to the CMM orientation axis. The pin 206 may be a locking pin or other securing mechanism to align with the slots 114 on the adapter plate 100 and may be able to secure the adapter plate relative to the alignment tool. Therefore, the desired slot 114 of the adapter plate 100 may be aligned with the pin 206 in the alignment tool 200.

Figure 3C:
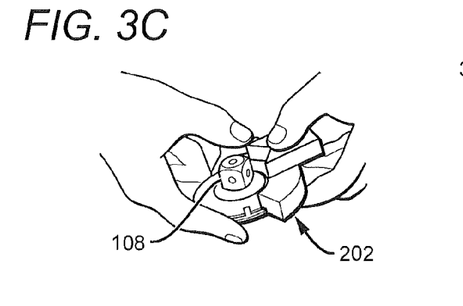
FIG. 3C is a perspective view of the adapter plate and alignment tool adapted together in an exemplary embodiment of the present invention.

Step 302, FIG. 3C, is optional and depends on the chosen adapter plate 100 and alignment tool 200 embodiments, but the adapter plate 100 may be engaged with the alignment tool 200 to keep proper alignment between the adapter plate and the alignment tool. For the embodiment shown, the pin 206 may be a locking pin that is engaged by pushing in toward the frame 202 or released by pulling the pin away from the frame. Therefore, a user may push down on the pin 206 to engage the locking pin and secure the adapter plate 100 in proper alignment with the frame 202 of the alignment tool 200. The cube 108 may still be permitted to rotate relative to the adapter plate 100.

Figure 3D:
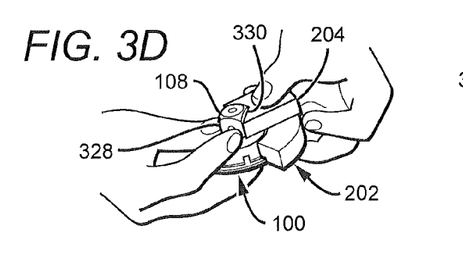
FIG. 3D is a perspective view of the adapter plate and alignment tool in an exemplary embodiment of the present invention.

Then, Step 304, referring to FIG. 3D, the cube 108 may be aligned with the alignment tool 200 relative to the already aligned adapter plate 100. The cube 108 is permitted to rotate relative to the adapter plate 100. In one embodiment, the alignment tool 200 may include a v-block 204 to align a corner 328 of cube 108 within a seat 330 on the v-block. The seat 330 may be a generally indented V-shape (or triangular as described above), to properly position the cube 108. In one embodiment, the v-block 204 may be permitted to slide relative to the frame 202. To align the cube, the v-block 204 may be slid against a corner of the cube 108, and the cube 108 is permitted to rotate to properly set within the seat 330 of the v-block. The v-block 204 may also be biased in an inward or outward position. For example, the v-block 204 may be biased radially away from the cube 108 to prevent interference during the previous alignment steps of the frame 202 with the adapter plate 100. Therefore, now, the v-block 204 may be slid towards the cube 108 to properly align the cube. Alternatively, the v-block 204 may be biased towards the cube 108, and may be slid and held away from the cube during alignment of the frame 202 with the adapter plate 100 in the previous steps. Now, the v-block 204 would be released to permit it to slide under its own bias towards the cube.

Figure 3E:
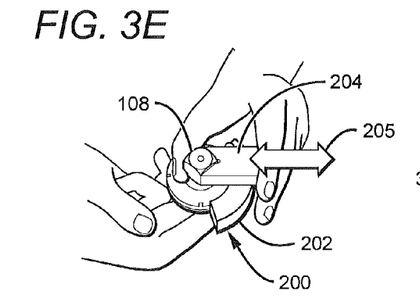
FIG. 3E is another perspective view of the adapter plate and alignment tool in an exemplary embodiment of the present invention.

Step 305, referring to FIG. 3E, which may be optional and ultimately depends on the chosen adapter plate 100 and alignment tool 200 embodiments. However, the cube 108 may be secured to the alignment tool to keep proper alignment between the cube and the alignment tool. In one embodiment, the v-block 204 may be pushed and held against the cube 108 (arrow 205). Alternatively, if the v-block 204 is biased towards the cube 108, then no pressure needs to be added to secure the v-block against the cube. In another embodiment, the v-block 204 may include a lock to secure the v-block against the cube 108. The lock (not shown) may be any mechanism to secure the v-block 204 relative to the frame 202 and against the cube 108. For example, the v-block or frame may include a detent to frictionally hold the v-block in position towards the cube.

Figure 3F:
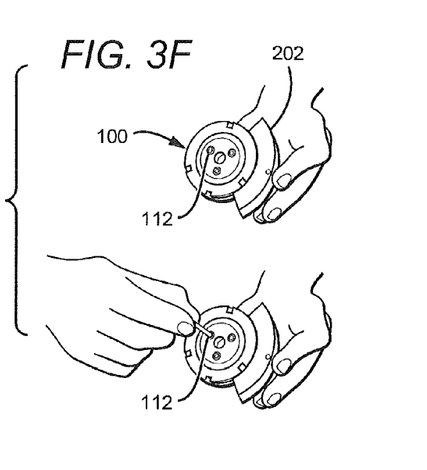
FIG. 3F is a bottom view of the adapter plate and alignment tool in an exemplary embodiment of the present invention.

Step 306, referring to FIG. 3F, whereby the cube 108 may be secured relative to the adapter plate 100. In an exemplary embodiment, the screws 112 loosened in step 300 which is illustrated in FIG. 3A, may be tightened to secure the cube 108 and prevent further rotation relative to adapter plate 100. The adapter plate 100 with alignment tool 200 may be turned over to expose the lower surface 103a and screws 112. Other securing devices may alternatively be used, such as locking pins, detent, friction, adhesive, etc. The appropriate tightening to prevent relative rotation will depend on the embodiment of the adapter plate. The alignment tool may then be removed from the adapter plate, and the adapter plate prepared for use in the CMM.

Figure 4:
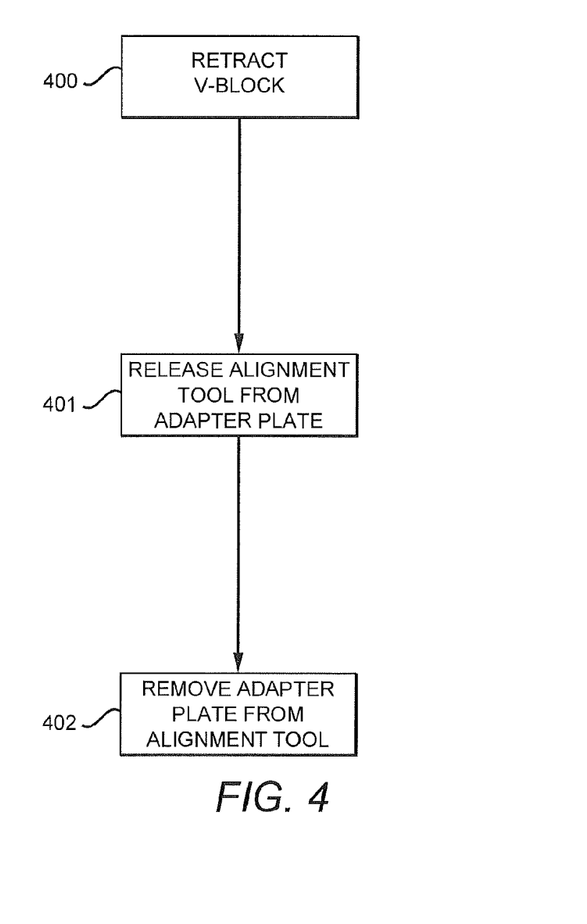
FIG. 4 is a block diagram of a illustrative method of the adapter plate in an exemplary embodiment of the present invention.
Figure 4A:
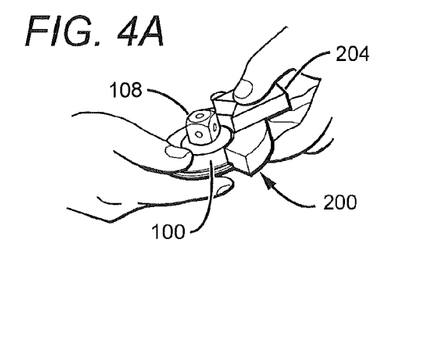
FIG. 4A is a perspective view of the adapter plate and alignment tool in an exemplary embodiment of the present invention.
Figure 4B:
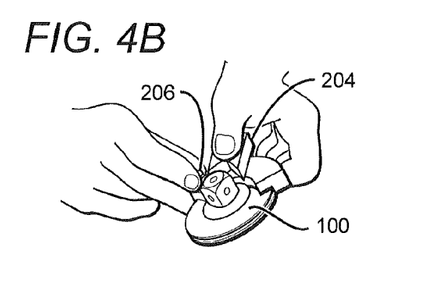
FIG. 4B is another perspective view of the adapter plate and alignment tool in an exemplary embodiment of the present invention.
Figure 4C:
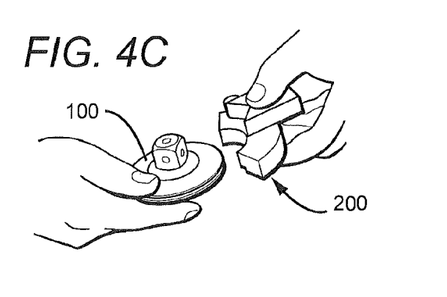
FIG. 4C is another perspective view illustrating separation of the alignment tool from the adapter plate in an exemplary embodiment of the present invention.

FIG. 4 represents a block diagram of an illustrative method of removing the alignment tool from the adapter plate. FIGS. 4A-4C illustrate physical representations of each step for an exemplary embodiment. First, step 400 the v-block may be removed from the cube. Then step 401, optionally, depending on the embodiment, the alignment tool may be released from the adapter plate. Finally, step 402 the adapter plate may be removed from the alignment tool. The adapter plate is then properly aligned with the CMM coordinate axis. The adapter plate may then be further prepared for use by attaching the desired stylus or styli cluster and attached to the CMM for use.

In an exemplary embodiment, the first step 400 may be optional depending on the exemplary embodiment, whereby the v-block 204 may be removed from the cube 108. In an exemplary embodiment, the v-block 204 may be slid away from the cube 108. In another embodiment, the v-block 204 may be biased away from the cube 108; therefore, the v-block is simply released to permit it to slide away from the cube. If other securing mechanisms are embodied to secure the v-block against the cube, these mechanism may be released.

Following first step 400, step 401 may be optionally implemented, depending on the embodiment whereby the alignment tool 200 may be released from the adapter plate 100. For example, in an exemplary embodiment, the securing mechanism of the alignment tool 200 may be released. In one embodiment, the pin 206 is released by pulling up away from the alignment tool, thereby releasing the adapter plate 100 from the alignment tool 200.

Finally, step 402 illustrates the adapter plate 100 which may be removed from the alignment tool 200. Once all securing mechanisms are released, the adapter plate 100 may be slid away of the alignment tool 200. The alignment tool 200 has squared (spending on the chosen alignment) the adapter plate cube 108 to the CMM coordinate axis. The alignment is fast, accurate, and easy to use. The alignment tool 200 and adapter plate 100 may be handheld to permit easy user alignment without the need of other tools or machines.

The alignment tool 200 may be made of various materials to permit easy manipulation, while maintaining a robust part. For example, the alignment tool 200 may be metal, or a metal alloy, including aluminum, steel, or may be a plastic, rubber, or synthetic material, or combinations of any of the above.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. An apparatus for aligning an adapter plate with an axis of a coordinate measuring machine, the apparatus comprising:
    a frame;
    a v-block coupled to the frame; and
    a locking mechanism on the frame that affixes the apparatus to the adapter plate during alignment.

2. The apparatus of claim 1, wherein the v-block is slidably coupled to the frame.

3. The apparatus of claim 1, wherein the v-block includes a shaped edge to fit with the adapter plate.

4. The apparatus of claim 1, wherein the v-block is positioned relative to the locking mechanism to properly align the adapter plate with the axis of the coordinate measuring machine 5. The apparatus of claim 1, configured to properly align the adapter plate with the axis of the coordinate measuring machine, wherein the adapter plate comprises:
    at least one slot on an upper surface of the adapter plate;
    a cube connected to the adapter plate; wherein the cube is permitted to rotate relative to the adapter plate; and
    a securing mechanism that affixes the cube to the adapter plate and prevents further rotation of the cube relative to the adapter plate.

6. The apparatus of claim 5, wherein the locking mechanism of the apparatus is configured to secure to the slot on the adapter plate and the v-block is configured to slide and abut a corner of the cube.

7. The apparatus of claim 6, wherein the locking mechanism is positioned relative to the v-block, so that when the locking mechanism is secured to the adapter plate and the v-block abuts the corner of the cube, the adapter plate is properly aligned with the axis of the coordinate measuring machine.

8. A method to align an adapter plate with an axis of a coordinate measuring machine, wherein the adapter plate includes a cube coupled to the adapter plate that is permitted to rotate relative to the adapter plate and a securing mechanism to prevent the cube from rotating relative to the adapter plate; comprising:
    permitting the cube to rotate relative to the adapter plate;
    aligning the adapter plate with an alignment tool, wherein the alignment tool includes a v-block slidably coupled to a frame and a locking mechanism coupled to the frame;
    locking the adapter plate to the alignment tool;
    positioning the v-block of the alignment tool against a corner of the cube of the adapter plate; and
    securing the securing mechanism of the adapter plate to prevent the cube from rotating relative to the adapter plate.

9. The method of claim 8, wherein aligning the adapter plate is by inserting the locking mechanism of the alignment tool into a slot on the adapter plate.

10. The method of claim 9, wherein positioning the v-block against the corner of the cube is by sliding the v-block against the cube while permitting the cube to rotate so that a corner of the cube is seated inside an indention in the v-block.

11. The method of claim 10, wherein the locking mechanism of the alignment tool is positioned relative to the v-block so that when the v-block is positioned against the corner of the cube, the adapter plate is properly aligned with the axis of the coordinate measuring machine.

* * * * *